(12) United States Patent
Marino et al.

(10) Patent No.: US 11,010,680 B1
(45) Date of Patent: May 18, 2021

(54) MEMORY EFFICIENCY OF PRODUCTION RULE SYSTEMS

(71) Applicant: NortonLifeLock Inc., Tempe, AZ (US)

(72) Inventors: Daniel Marino, Los Angeles, CA (US); Kevin Roundy, El Segundo, CA (US); Acar Tamersoy, Culver City, CA (US); Sandeep Bhatkar, Sunnyvale, CA (US)

(73) Assignee: NortonLifeLock Inc., Tempe, AZ (US)

( * ) Notice: Subject to any disclaimer, the term of this patent is extended or adjusted under 35 U.S.C. 154(b) by 895 days.

(21) Appl. No.: 15/649,555

(22) Filed: Jul. 13, 2017

(51) Int. Cl.
*G06N 5/04* (2006.01)

(52) U.S. Cl.
CPC .................... *G06N 5/047* (2013.01)

(58) Field of Classification Search
CPC .......... G06N 5/047; G06N 5/00; G06N 5/003; G06N 5/02; G06N 5/022; G06N 5/025; H04L 29/06578; H04L 29/06585; H04L 29/06598; H04L 29/06605
USPC .......................................................... 706/48
See application file for complete search history.

(56) References Cited

U.S. PATENT DOCUMENTS

| | | | | |
|---|---|---|---|---|
| 4,951,225 A * | 8/1990 | Lee | .................... | G06N 5/047 706/48 |
| 7,899,901 B1 * | 3/2011 | Njemanze | ............ | G06F 21/552 709/224 |
| 2014/0245374 A1 * | 8/2014 | Deerman | .................. | F01D 3/04 726/1 |

OTHER PUBLICATIONS

"The Rete Algorithm Improvement and Implementation," Dongdai Zhou, Yifan Fu, Shaochun Zhong, Ruiqing Zhao, 2008 International Conference on Information Management, Innovation Management and Industrial Engineering (2008) (Year: 2008).*
"Relative Temporal Constraints in the Rete Algorithm for Complex Event Detection," Karen Walzer, Tino Breddin and Matthias Groch, DEBS '08, Jul. 1-4, 2008, Rome, Italy (Year: 2008).*
"Time to the Rescue—Supporting Temporal Reasoning in the Rete Algorithm for Complex Event Processing," Karen Walzer, Matthias Groch, and Tino Breddin, Database and Expert Systems Applications, 19th International Conference, DEXA 2008, Turin, Italy, Sep. 1-5, 2008 Proceedings (Year: 2008).*
Meier et al ("Efficiency Issues of Rete-based Expert Systems for Misuse Detection")l (Year: 2007).*
Shell, Peter, and Jaime Carbonell. "Towards a General Framework for Composing Disjunctive and Iterative Macro-operators." Semantic Scholar: https://pdfs.semanticscholar.org/b71a/c51479017b474d668c4058dea1c3294cd274.pdf. Accessed Jul. 12, 2017.
Agrawal, Jagrati, Yanlei Diao, Daniel Gyllstrom, and Neil Immerman. "Efficient Pattern Matching Over Event Streams." Department of Computer Science, University of Massachusetts, Amherst, Jun. 9-12, 2008: https://people.cs.umass.edu/~yanlei/publications/sase-sigmod08.pdf. Accessed Jul. 13, 2017.

(Continued)

*Primary Examiner* — Lut Wong
(74) *Attorney, Agent, or Firm* — Holland & Hart LLP

(57) ABSTRACT

A method for improving memory efficiency of production rule systems is described. In one embodiment, the method includes identifying a rule associated with production rule systems, constructing a production rule network based at least in part on the rule, identifying a positional constraint associated with the rule, and implementing an alpha memory gate in the production rule network based at least in part on the positional constraint. In some cases, the alpha memory gate is one of a plurality of nodes of the production rule network.

20 Claims, 8 Drawing Sheets

(56) References Cited

OTHER PUBLICATIONS

Jin, Chun, and Jaime Carbonell. "ARGUS: Rete + DBMS=Efficient Continuous Profile Matching on Large-Volume Data Streams." School of Computer Science, Carnegie Mellon University, Jul. 6, 2004: http://www.cs.cmu.edu/~cjin/publications/Rete.pdf. Accessed Jul. 13, 2017.

\* cited by examiner

MEMORY EFFICIENCY OF PRODUCTION RULE SYSTEMS

BACKGROUND

The use of computer systems and computer-related technologies continues to increase at a rapid pace. This increased use of computer systems has influenced the advances made to computer-related technologies. Computer systems have increasingly become an integral part of the business world and the activities of individual consumers. Computer systems may be used to carry out several business, industry, and academic endeavors.

The wide-spread use of computers and mobile devices has caused an increased presence of malicious programs such as rootkits, spyware, trojans, and the like. Malware programmers are continually adapting to the improvements made in malware detection, which creates an ongoing cycle of malware techniques adapting to improvements in malware detection.

SUMMARY

According to at least one embodiment, a method for improving memory efficiency of production rule systems is described. In one embodiment, the method may include identifying a rule associated with production rule systems, constructing a production rule network based at least in part on the rule, identifying a positional constraint associated with the rule, and implementing an alpha memory gate in the production rule network based at least in part on the positional constraint. In some cases, the alpha memory gate may be one of a plurality of nodes of the production rule network.

In one example, the plurality of nodes of the production rule network may include one or more nodes in an alpha network and one or more nodes in a beta network. In some cases, the alpha memory gate may be positioned in between the alpha network and the beta network. In some cases, an alpha memory of the alpha network may receive an input and the alpha memory gate controls whether the input is allowed to pass downstream to the beta network.

In some embodiments, the method may include activating the alpha memory gate according to a value specified in the positional constraint. In some cases, the alpha memory gate when activated may permit the input stored by the alpha memory to pass from the alpha network to the beta network.

In some embodiments, the method may include deactivating the alpha memory gate according to a value specified in the positional constraint and removing the input from the alpha memory based at least in part on the deactivation of the alpha memory gate. In some cases, the alpha memory gate when deactivated does not permit the input stored by the alpha memory to pass from the alpha network to the beta network. In some cases, the alpha memory gate is positioned within the production rule network according to an aspect of the rule. In some cases, the alpha memory gate may be configured according to an aspect of the positional constraint.

In some embodiments, the method may include implementing the production rule network to monitor a computing device. In some embodiments, the method may include performing a security action based at least in part on the monitoring. In some cases, nodes of the production rule network may be constructed and positioned in the production rule network according to a Rete algorithm.

A computing device configured for improving memory efficiency of production rule systems is also described. The computing device may include one or more processors and memory in electronic communication with the one or more processors. The memory may store computer executable instructions that when executed by the one or more processors cause the one or more processors to perform the steps of identifying a rule associated with production rule systems, constructing a production rule network based at least in part on the rule, identifying a positional constraint associated with the rule, and implementing an alpha memory gate in the production rule network based at least in part on the positional constraint. In some cases, the alpha memory gate may be one of a plurality of nodes of the production rule network.

A non-transitory computer-readable storage medium storing computer executable instructions is also described. When the instructions are executed by one or more processors, the execution of the instructions may cause the one or more processors to perform the steps of identifying a rule associated with production rule systems, constructing a production rule network based at least in part on the rule, identifying a positional constraint associated with the rule, and implementing an alpha memory gate in the production rule network based at least in part on the positional constraint. In some cases, the alpha memory gate may be one of a plurality of nodes of the production rule network.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
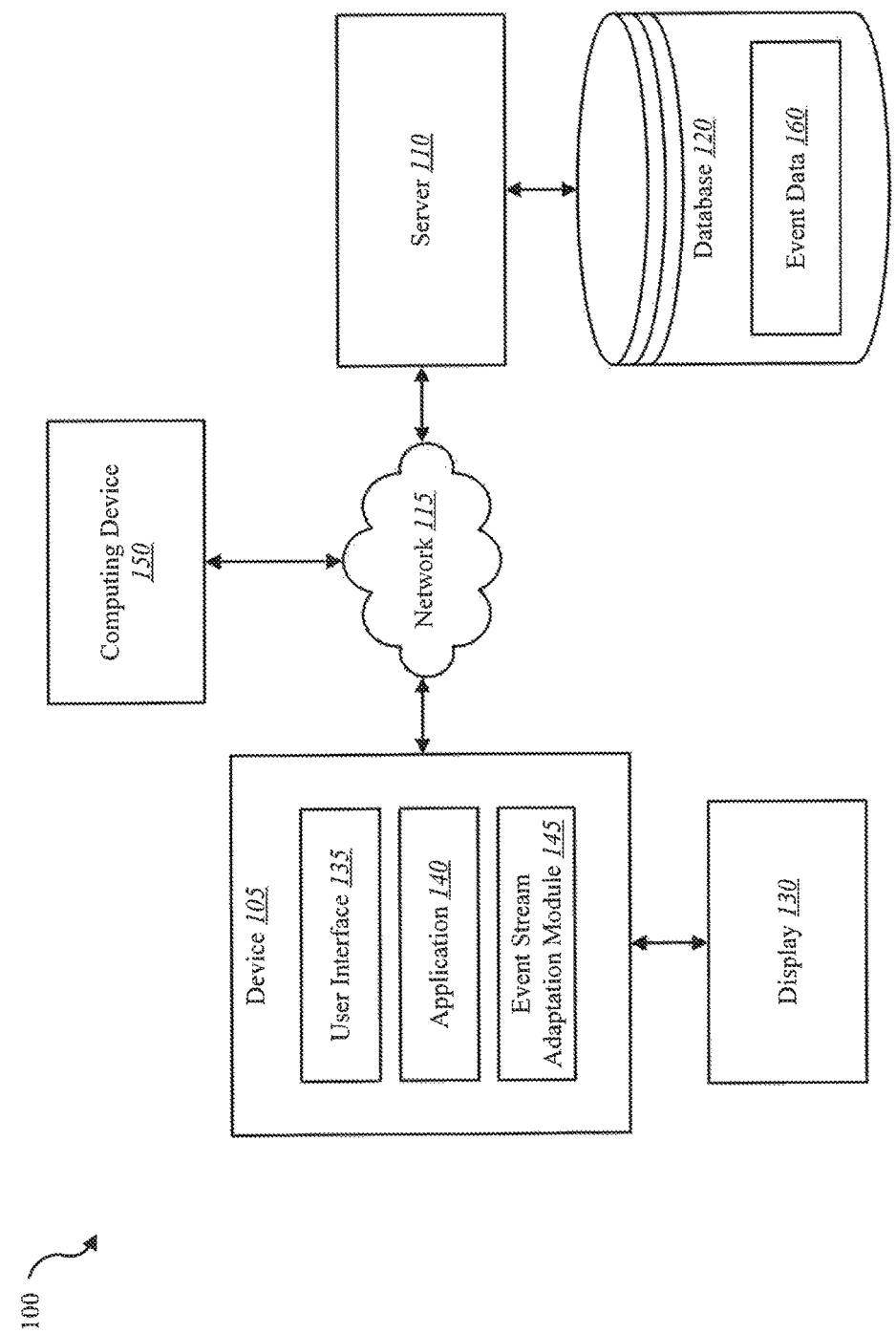
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to improving memory efficiency of production rule systems. More specifically, the systems and methods described herein relate to improving memory efficiency of production rule systems in relation to unbounded streams of events. The present systems and methods provide an efficient rules-based matching engine capable of efficiently handling ordered streams of data. Some examples of ordered streams of data include various types of network processing (intrusion detection system (IDS), firewall, etc.), alerts in security information and event management (SIEM) and log monitoring systems, etc.

In some embodiments, the present systems and methods may be configured to look for patterns in streams of events such as telemetry data from endpoints actively monitored and protected via antivirus and/or firewall software. The present systems and methods may record fine-grained, low level events for every process on an endpoint, including data such as process and module loads, file and registry writes, and network connections. The present systems and methods may be configured to efficiently find sets of events that match constraint patterns specified by updatable rules. In some cases, the present systems and methods may be configured to find a sequence of particular events executed in a process, representing a sort of behavioral signature. One example of a rule from the present systems and methods may include "emit an alert if a process writes to registry key X or Y, then launches a child process, then creates a registry value Z." These signatures may be referred to as n-grams learned from traces that involve a subset of captured events. In some cases, these signatures may occur relatively near to each other, but may have interleaving non-related events.

The Rete algorithm is a widely-used approach for implementing production rules systems. A Rete network constructed based on a Rete algorithm may be configured to process a database of facts or events, looking for sets of facts that match conditions specified in rules.

The present systems and methods includes a set of extensions of the Rete algorithm in order to support efficient pattern matching on ordered, streams of facts or events. In one embodiment, the present systems and methods include the capability to express and efficiently implement join constraints based on the relative stream position of facts. In some embodiments, the present systems and methods improve the efficient use of memory and/or storage space and safely retire facts and clear up memory. The present systems and methods enable the capacity to process an essentially infinite database of facts. The present systems and methods leverage the unique efficiencies of the Rete matching algorithm while allowing for efficient implementation of constraints on relative position and selective storage and retiring of facts from a potentially unbounded stream.

The present systems and methods introduce the concept of an activation period to the Rete algorithm. The activation period enables efficient checking of constraints on relative position and efficient use of space for storing facts. The present systems and methods extend the network data structure of the basic Rete algorithm by adding a new node type, "alpha memory gates." In some embodiments, the present systems and methods introduce a scheduler to activate these alpha memory gates. In addition, the present systems and methods apply a definition-use (def-use) style analysis over the Rete graph in order to gain further space efficiency.

Matching rules are conjunctions of tests. Tests come in two flavors: intra-fact tests and join tests involving two facts. In Rete parlance, these tests are called alpha tests and beta tests, respectively. The Rete algorithm compiles a set of rules into a network (directed graph, or directed acyclic graph (DAG)) of nodes that perform the tests. There are two parts to the network: the alpha network and the beta network. The alpha network performs alpha tests (on individual facts) and the beta network performs beta tests (joins between two facts). Each alpha node performs a particular test. Rules that perform the same alpha test can often reuse the same node. Nodes downstream from a test are not executed unless all of the upstream tests have succeeded (essentially, a directed graph where each path is a lazy AND).

The leaf nodes in the alpha network are called alpha memories, and facts that match all the conditions on the path are stored in these memories. Individual facts are fed to the network, and stored in appropriate alpha memories only if they match the intra-fact conditions specified by at least one of the rules. While these alpha memories are leaf nodes of the alpha network, they are not leaf nodes of the overall combined Rete network. The alpha memories feed the beta network which consists of beta join nodes, beta memories, and beta action nodes. Each beta join node has one alpha memory as a parent and one beta memory as a parent. The beta join node springs into action only when one of its parent memories changes. When a fact is added to one of its parent memories, a beta join node may check if the new fact can be successfully joined with one of the facts in its other parent. If so, the beta join node stores this joined set of facts in its beta memory. As we move deeper in the beta network, more and more facts are joined together. The true leaf nodes in the Rete network are the beta action nodes. When these nodes are activated, all of the tests for a match rule have been satisfied: we have found a fact for each of the rule's fact variables that meets all of the alpha (intra-fact) tests in the rule and this set of facts meets all of the beta (join) tests in the rule. At this point the appropriate, application-specific action can be taken (generating a new fact, emitting an alert, etc.).

The basic Rete algorithm assumes a finite knowledge base of facts. There is no concept of operating on a stream of facts or unbounded stream of facts. It is true that the Rete algorithm supports addition and removal of facts. Thus, an obvious approach to using the Rete algorithm on a stream of facts may be to specify a maximum window size within which a match must be found. As an example, if a window size of 1000 facts is specified, then the Rete network may operate on the stream by storing the first 1000 events and pushing the events through the Rete network. Then for each new fact that arrives, the oldest fact is removed and the newest fact added. To constrain the ordering or relative positioning of the facts in the stream, a "fact number" field may be automatically added and may be incremented for each fact read off of the stream in the order in which each fact is read and/or in the order in which the fact is positioned in the stream. Rules could then include join tests like "x.fact_number<y.fact_number" or "x.fact_number−y.fact_number between 1 and 10."

However, a fixed-window size approach has several weaknesses or shortcomings. For example, a fixed size window may not be appropriate for all rules. Some rules may look for patterns that span many positions, while others may look for facts or events that occur close together in the stream. For the fixed-window approach, the Rete network would have to be configured to choose the maximum window needed over all rules, and pay the cost of storing that potentially large number of facts for the many circumstances where a smaller window may be used. Also, explicit testing of relative positional constraints as part of beta join nodes may require many join condition tests between pairs of events in the window that do not meet the appropriate positional constraints, reducing efficiency.

To address these weaknesses, the present systems and methods introduce the concept of activation periods for facts and add new components into the Rete network to handle the activation periods. A new type of node, the alpha memory gate, is introduced at the interface between the alpha and beta networks (e.g., between alpha memories and beta join nodes). The alpha memory gate nodes may be configured to control when matches stored in an alpha memory cause activations in, and are visible to, the beta network. The present systems and methods address the weaknesses of a fixed-window approach by limiting the period of time that alpha matches are tested by child beta join nodes to the time window appropriate to that particular rule. In some cases, the present systems and methods introduce a callback scheduler to efficiently trigger activation and deactivation of the alpha memory gate nodes without the need to traverse the entire Rete network, which further addresses the weaknesses of a fixed-window approach. For example, when all of the deactivations for an alpha memory match have been processed, stored events may be safely discarded from memory. In this way, the present systems and methods make efficient use of the Rete network memory while still allowing some rules to look over very large windows of events. In order to further optimize efficient use of storage, the present systems and methods introduce an analysis that runs on the compiled Rete graph and determines the minimal set of fields in each fact needed during each activation period. The present systems and methods can then discard portions of these facts (the unused fields) when they are guaranteed to longer be needed to determine matches or execute actions.

FIG. 1 is a block diagram illustrating one embodiment of an environment 100 in which the present systems and methods may be implemented. In some embodiments, the systems and methods described herein may be performed on a device (e.g., device 105). As depicted, the environment 100 may include a device 105, server 110, a display 130, a computing device 150, and a network 115 that allows the device 105, the server 110, and the computing device 150 to communicate with one another.

Examples of the device 105 may include any combination of mobile devices, smart phones, personal computing devices, computers, laptops, desktops, servers, media content set top boxes, digital video recorders (DVRs), or any combination thereof. Examples of computing device 150 may include at least one of one or more client machines, one or more mobile computing devices, one or more laptops, one or more desktops, one or more servers, one or more media set top boxes, or any combination thereof. Examples of server 110 may include any combination of a data server, a cloud server, proxy server, mail server, web server, application server, database server, communications server, file server, home server, mobile server, name server, or any combination thereof.

In some configurations, the device 105 may include a user interface 135, application 140, and event stream adaptation module 145. Although the components of the device 105 are depicted as being internal to the device 105, it is understood that one or more of the components may be external to the device 105 and connect to device 105 through wired and/or wireless connections. In some embodiments, application 140 may be installed on computing device 150 in order to allow a user to interface with a function of device 105, event stream adaptation module 145, and/or server 110.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the device 105 may not include event stream adaptation module 145. For example, device 105 may include application 140 that allows device 105 to interface with a separate device via event stream adaptation module 145 located on another device such as computing device 150 and/or server 110. In some embodiments, device 105, computing device 150, and server 110 may include event stream adaptation module 145 where at least a portion of the functions of event stream adaptation module 145 are performed separately and/or concurrently on device 105, computing device 150, and/or server 110. Likewise, in some embodiments, a user may access the functions of device 105 (directly or through device 105 via event stream adaptation module 145) from computing device 150. For example, in some embodiments, computing device 150 includes a mobile application that interfaces with one or more functions of device 105, event stream adaptation module 145, and/or server 110.

In some embodiments, server 110 may be coupled to database 120. Database 120 may be internal or external to the server 110. In one example, device 105 may be coupled to database 120. For example, in one embodiment database 120 may be internally or externally connected directly to device 105. Additionally or alternatively, database 120 may be internally or externally connected directly to computing 150 and/or or one or more network devices such as a gateway, switch, router, intrusion detection system, etc. Database 120 may include event data 160. As one example, device 105 may access event data 160 in database 120 over network 115 via server 110. Event data 160 may include data regarding events occurring on monitored endpoints such as client machines, monitored desktop computing devices, monitored laptop computers, monitored mobile computing devices, and the like. In some cases, event data 160 may include telemetry data sourced from one or more monitored client machines. Examples of event data may include data such as process and module loads, file and registry writes, and network connections, etc.

Event stream adaptation module 145 may improve memory efficiency of a production rule network of decision nodes. In some cases, event stream adaptation module 145 may adapt a production rule system to streams of facts/events of variable size. In some cases, operations performed by the event stream adaptation module 145 in relation to a pattern matching system improve the memory efficiency of the pattern matching system. In some cases, event stream adaptation module 145 enables efficient implementation of constraints on relative position of events, selective storage of events, and retiring or discarding of events in relation to a potentially unbounded stream of events. In some embodiments, event stream adaptation module 145 may be configured to perform the systems and methods described herein in conjunction with user interface 135 and application 140. User interface 135 may enable a user to interact with, control, and/or program one or more functions of event stream adaptation module 145. Further details regarding the event stream adaptation module 145 are discussed below.

Figure 2:
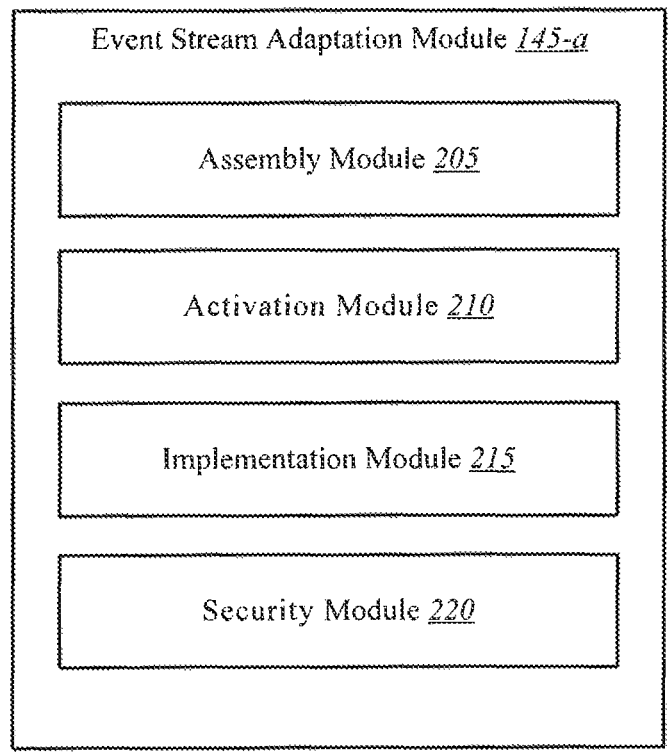
FIG. 2 is a block diagram illustrating one example of one or more modules in accordance with various aspects of this disclosure.

FIG. 2 is a block diagram illustrating one example of event stream adaptation module 145-a. Event stream adaptation module 145-a may be one example of event stream adaptation module 145 depicted in FIG. 1. As depicted, event stream adaptation module 145-a may include assembly module 205, activation module 210, implementation module 215, and security module 220.

In one embodiment, assembly module 205 may be configured to identify a rule associated with a production rule system. In some cases, assembly module 205 may be configured to identify one or more rules associated with a production rule system. In some embodiments, one or more rules may be provided by an administrator of the production rule system. In one example, rules may be generated according to patterns an administrator is interested in detecting in data that is fed through the production rule system. For example, an administrator may provide one or more rules to detect patterns in telemetry data sourced by one or more client machines being monitored by the administrator.

In some embodiments, assembly module 205 may be configured to construct a production rule network based at least in part on the one or more rules. In some cases, nodes of the production rule network may be constructed and positioned in the production rule network according to a Rete algorithm. In some cases, the one or more rules include a set of source rules used to build a network of decision nodes that are part of the production rule system. In some embodiments, assembly module 205 may be configured to identify a positional constraint associated with the one or more rules.

In some embodiments, assembly module 205 may be configured to implement an alpha memory gate in the production rule network based at least in part on the positional constraint. In some cases, the alpha memory gate may be positioned within the production rule network according to an aspect of the one or more rules. In some cases, the alpha memory gate may be configured according to an aspect of the positional constraint.

In some cases, the plurality of nodes of the production rule network may include one or more nodes in an alpha network and one or more nodes in a beta network, and wherein the alpha memory gate is positioned in between the alpha network and the beta network. In some cases, an alpha memory of the alpha network may receive an input and the alpha memory gate controls whether the input is allowed to pass downstream to the beta network. In some embodiments, the input may include one or more events from a stream of events such as events associated with telemetry data from endpoints actively monitored and protected via antivirus and/or firewall software.

In some embodiments, activation module 210 may be configured to activate the alpha memory gate according to a value specified in the positional constraint. In some cases, the alpha memory gate when activated permits the input stored by the alpha memory to pass from the alpha network to the beta network.

In some embodiments, activation module 210 may be configured to deactivate the alpha memory gate according to a value specified in the positional constraint. In some examples, the deactivation of an alpha memory gate may allow removal of events from an associated alpha memory to save memory and improve memory efficiency. Accordingly, in some cases, implementation module 215 may remove the input from the alpha memory based at least in part on the deactivation of the alpha memory gate. In one example, a first alpha memory gate and a second alpha memory gate may be associated with the same alpha memory. In the example, the activation module 210 may deactivate the first alpha memory gate. When the second alpha memory gate is still active or becomes active, the deactivation of the first alpha memory gate may still allow removal of at least a portion of data associated with the first alpha memory gate and stored in the alpha memory when the activation module 210 determines the data is no longer needed. In some cases, the activation module 210 may determine the data is no longer needed based on deactivating the first alpha memory gate. In some cases, activation module 210 may determine the data is no longer needed based on activation module 210 performing an analysis of the portions of the event used in the beta nodes downstream from the first and second alpha memory gates. Upon determining the analysis indicates the at least portion of the event data used in the beta nodes downstream are no longer needed, implementation module 215 may remove the the at least portion of the event data from the alpha memory. In some cases, the alpha memory gate when deactivated does not permit the input stored by the alpha memory to pass from the alpha network to the beta network.

In some cases, the alpha memory gate may be one of multiple nodes of the production rule network. In some cases, assembly module 205 implements an activation period in relation to a Rete algorithm or a production rule network constructed based on a Rete algorithm. In some cases, the activation period may enable the assembly module 205 to efficiently check positional constraints on relative position of events and efficient use of space for storing events. In some cases, a positional constraint may constrain which events are allowed to pass downstream to a beta network based on a position of a particular event relative to positions of a circular schedule queue. In some cases, a positional constraint may configure one or more aspects of an alpha memory gate. An alpha memory gate in an alpha network may control, as specified by an associated positional constraint, when matches stored in an alpha memory of the alpha network cause activations in, and are visible to, nodes of an associated beta network.

In some embodiments, implementation module 215 may be configured to implement the production rule network to monitor a computing device. In some embodiments, security module 220 may be configured to perform a security action based at least in part on the monitoring. In some embodiments, security module 220 may be configured to perform a security action based at least in part on the optimizing of the production rule network according to the operations associated with the assembly module 205, activation module 210, implementation module 215, and security module 220, or any combination thereof.

Figure 3:
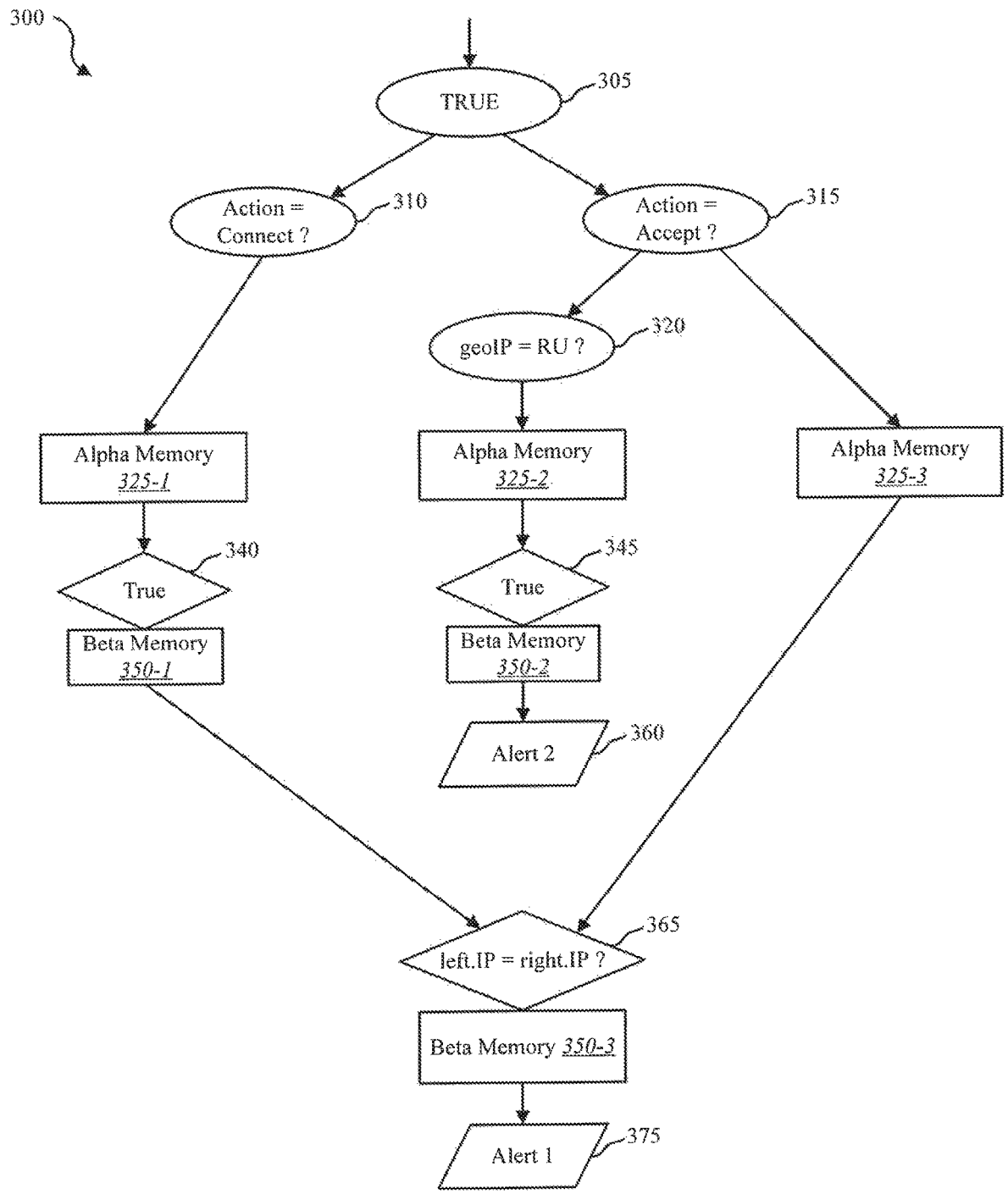
FIG. 3 is one example of a production rules network implemented in accordance with various aspects of this disclosure.

FIG. 3 illustrates one example of a production rules network 300 implemented in accordance with various aspects of this disclosure. In some configurations, the production rules network 300 may be implemented by the event stream adaptation module 145 illustrated in FIGS. 1 and/or 2. In some configurations, the production rules network 300 may be implemented in conjunction with device 105, server 110, network 115, database 120, components thereof, or any combination thereof.

In one embodiment, a production rule system may include one or more rules. In some cases, a Rete algorithm may be implemented to build a network of nodes based on the one or more rules. As one example, a first rule may include: IF (x.action=connect) AND (y.action=accept) AND (x.IP=y.IP) THEN Alert 1. Thus, the first rule may include determining whether the action "connect," whether the event y includes the condition "accept," determining whether the internet protocol (IP) address of event x equals the IP address of event y, and when each condition is true triggering the action "Alert 1." As one example, Alert 1 may include a first notification indicating all the conditions of the first rule have been met, which first notification may be sent to a predetermined recipient such as an administrator. A second rule may include: IF (y.action=accept) AND (y.geoIP=RU) THEN Alert 2. Thus, the second rule may be configured to test whether the event y includes the action "accept," whether a geolocation IP (geoIP) of the event y indicates the action originates in Russia, and when each condition is true triggering the action "Alert 2." As one example, Alert 2 may include a second notification indicating all the conditions of the second rule have been met, which second notification may be sent to a predetermined recipient such as an administrator.

In some cases, FIG. 3 illustrates one example of implementing a production rules network 300 based at least in part on the first and second rules. As shown in FIG. 3, the network 300 may include a network of nodes. When a node receives an event, if the event is true the node passes along the event to all of its children. Thus, where a node is set or hardcoded to be "true" in the case of any input, such a node will always pass incoming events downstream to its children nodes. In one embodiment, a first alpha test node 305 may be configured to be always true, which results in any input such as a fact, event, or condition being fed to network 300 passing through to the children nodes of first alpha test node 305 every time. The children of first alpha test node 305 may include second alpha test node 310 and third alpha test node 315. As shown, second alpha test node 310 may test whether an action associated with an input is equal to "connect." Likewise, third alpha test node 315 may test whether an action associated with an input is equal to "accept." In one embodiment, second alpha test node 310 may filter what data to save in alpha memory 325-1. For example, when an action of an input is equal to "connect," then second alpha test node 310 may pass the input on to alpha memory 325-1 and alpha memory 325-1 may store the received input. Otherwise, second alpha test node 310 may discard the input. Similarly, third alpha test node 315 may filter what data to save in alpha memory 325-3. For example, when an action of an input is equal to "accept," then third alpha test node 315 may pass the input on to alpha memory 325-3 and alpha memory 325-3 may store the received input. Otherwise, third alpha test node 315 may discard the input. As shown, third alpha test node 315 may also include fourth alpha test node 320 as a child node. In one embodiment, first alpha test node 305, second alpha test node 310, third alpha test node 315, and fourth alpha test node 320 may be referred to as the alpha network or the alpha network of nodes. In some cases, alpha memory 325-1, alpha memory 325-2, and alpha memory 325-3 may be referred to as the memories of the alpha network.

In some embodiments, when an action of an input of third alpha test node 315 is equal to "accept," in addition to sending this input to alpha memory 325-3 to be stored there, third alpha test node 315 may also pass this input on to fourth alpha test node 320. In some cases, fourth alpha test node 320 may pass on data to be saved in alpha memory 325-2. In the example illustrated, alpha memory 325-1 may pass on an input downstream to first beta join node 340.

Similarly, alpha memory 325-2 may pass on an input downstream to second beta join node 345. As shown, a test condition for both first beta join node 340 and second beta join node 345 may be hardcoded to "true." Thus, any input received by first beta join node 340 and/or second beta join node 345 may be forwarded on to their respective child nodes. Accordingly, in the example shown first beta join node 340 may store a received input in beta memory 350-1. Similarly, second beta join node 345 may store a received input in beta memory 350-2. In the illustrated example, any data reaching beta memory 350-2 may trigger an action from first beta action node 360. In one embodiment, an action triggered by first beta action node 360 may include the action Alert 2 according to the second rule of network 300.

As shown in the illustrated example, beta memory 350-1 may store an input received from first beta join node 340. This input may be referred to as a "left input." In some cases, beta memory 350-1 may hold the left input in memory, making the left input available to be used by third beta join node 365. Similarly, alpha memory 325-3 may store an input received from third alpha test node 315. This input may be referred to as a "right input." In some cases, alpha memory 325-3 may hold the right input in memory, making the right input also available to be used by third beta join node 365. In one embodiment, third beta join node 365 may test whether an IP address associated with the left input equals an IP address associated with the right input. When the third beta join node 365 determines the IP address of the left input equals the IP address of the right input, third beta join node 365 may store the left input and the right input in beta memory 350-3. Upon detecting both the left input and the right input being stored in beta memory 350-3, second beta action node 375 performs an action such as the action "Alert 1." In one embodiment, first beta join node 340, second beta join node 345, and third beta join node 365 may be referred to as the beta network or beta network of nodes. In some cases, beta memory 350-1, beta memory 350-2, and beta memory 350-3 may be referred to as the memories of the beta network. Similarly, first beta action node 360 and second beta action node 375 may be referred to as the action nodes of the beta network. In some cases, a node from the alpha network may perform a test on a single fact from a single parent node. On the other, a node from the beta network may perform a test on two or more facts from two or more parent nodes.

As one example, a first input may be received by first alpha test node 305. In this example, the first input includes the action "accept" and is associated with a Russian IP address 100.200.300.400. Since the test result of first alpha test node 305 is hardcoded to "true," first alpha test node 305 passes on the first input to both the second alpha test node 310 and the third alpha test node 315. Second alpha test node 310 determines that the first input does not include the action "connect." Accordingly, second alpha test node 310 discards the first input. Also, third alpha test node 315 determines that the first input does include the action "accept." Accordingly, third alpha test node 315 allows the first input to proceed downstream to fourth alpha test node 320 and alpha memory 325-3. Alpha memory 325-3 stores the first input, which makes the first input available to third beta join node 365. Accordingly, third beta join node 365 may identify the first input as the right input and determine whether the IP address of the right input equals the IP address of the left input from beta memory 350-1. However, at this time beta memory 350-1 is empty, so the test fails. Nevertheless, alpha memory 325-3 continues to store the first input for future tests. Also, fourth alpha test node 320 determines that the first input is associated with a Russian IP address, accordingly, fourth alpha test node 320 passes on the first input to alpha memory 325-2, which makes the first input available to second beta join node 345. Since second beta join node 345 is hardcoded to "true," second beta join node 345 stores the first input in beta memory 350-2. Upon detecting the first input stored in beta memory 350-2, first beta action node 360 performs an action. In this case, first beta action node 360 performs the action "Alert 2."

In the same example, a second input may be received by first alpha test node 305. The second input includes the action "connect" and is associated with the Russian IP address 100.200.300.400. Third alpha test node 315 determines that the second input does not include the action "accept." Accordingly, third alpha test node 315 discards the second input. Also, second alpha test node 310 determines that the second input includes the action "connect." Accordingly, second alpha test node 310 passes on the second input to alpha memory 325-1. Alpha memory 325-1 stores the second input, making the second input available to first beta join node 340. Since first beta join node 340 is hardcoded to "true," first beta join node 340 stores the second input in beta memory 350-1, making the second input available to third beta join node 365. Third beta join node 365 may then retrieve the first input still stored in alpha memory 325-3 and retrieve the second input stored in beta memory 350-1. In this example, third beta join node 365 may identify the first input as the right input and the second input as the left input. Accordingly, third beta join node 365 may identify the IP address of the left input and the IP address of the right input and determine that the IP addresses of each input match. Upon determining the IP address of the left input equals the IP address of the right input, third beta join node 365 creates a join of the left input and the right input. Accordingly, third beta join node 365 may store both the right input (first input) and the left input (second input) in beta memory 350-3. Upon detecting both the left input and the right input being stored in beta memory 350-3, second beta action node 375 may then perform an action such as the action "Alert 1."

One problem with the network 300 is that testing of inputs may fail when the inputs include a stream of events with relative positional constraints that constrain which events are allowed to pass downstream to the beta network based on the position of a particular event. As an example, a first set of related events may occur within 100 events of one another, while a second set of related events may occur within 1000 events of one another. Network 300 may be limited to handle a fixed amount of events such as 500 events that may be stored in associated alpha memories and/or beta memories. Accordingly, network 300 with a window size of 500 may handle the 100 events of the first set of events, but fail to handle all of the events of the second set of events together because the stipulated maximum window size of 500 means only 500 out of the total 1000 events may be visible at any one time. Thus, network 300 ends up using too much memory or too large of a window size to handle the first set of events while not having enough memory or a large enough window size to handle the second set of events. In one embodiment, a solution to the problems of network 300 may include implementing an activation period. In some cases, the solution may include implementing a new node type: alpha memory gates.

Figure 4:
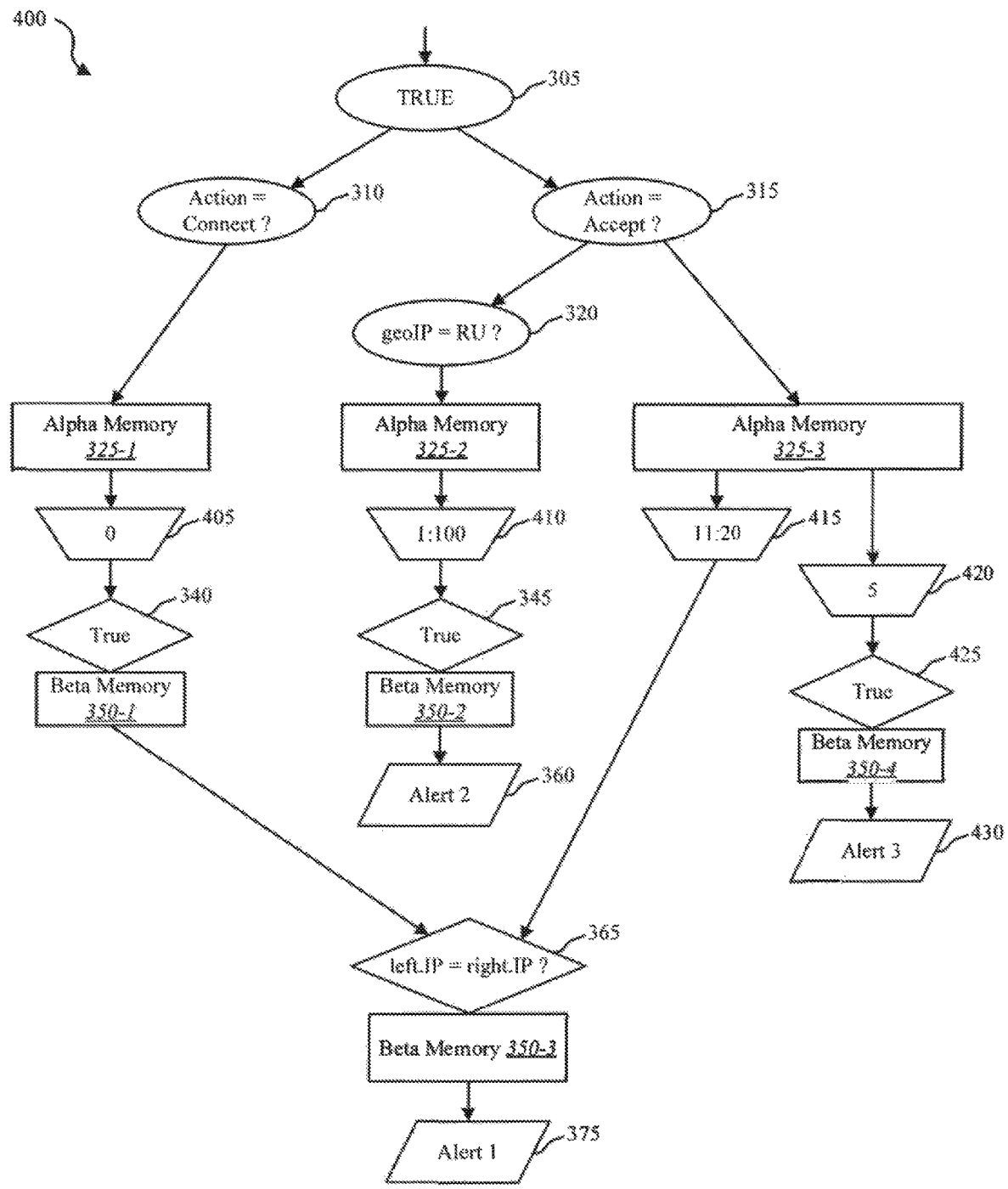
FIG. 4 is one example of a production rules network implemented in accordance with various aspects of this disclosure.

FIG. 4 illustrates one example of a production rules network 400 implemented in accordance with various aspects of this disclosure. In some configurations, the production rules network 400 may be implemented by the event stream adaptation module 145 illustrated in FIGS. 1 and/or 2. In some configurations, the production rules network 400 may be implemented in conjunction with device 105, server 110, network 115, database 120, components thereof, or any combination thereof. In some cases, FIG. 4 shows one embodiment of a production rules network 400 based at least in part on rules generated with relative positional constraints and configured to identify patterns in one or more streams of events. In some cases, network 400 may include a modified version of network 300. For example, network 400 may include one or more alpha memory gates based on an updated version of the rules used in network 300. In the illustrated example, network 400 may include first alpha memory gate 405, second alpha memory gate 410, third alpha memory gate 415, and fourth alpha memory gate 420. More or less alpha memory gates may be implemented than are shown in FIG. 4 according to the rules provided to construct a relative production rules network.

In some cases, a rule may include a test for one or more events occurring in relation to each other. For example, a rule may search for event x="create", event y="open", and event z="write" occurring within 100 events of each other. Accordingly, this rule may stipulate a positional constraint of (1:100) for each of x, y and z, and the rule may trigger one or more specified actions when the associated production rule system detects event x="create" AND event y="open" AND event z="write" all occurring within events 1 to 100. In some embodiments, a positional constraint may be associated with the alpha memory gate. For example, a positional constraint may configure one or more aspects of an alpha memory gate. An alpha memory gate in an alpha network may control, as specified by an associated positional constraint, when matches stored in an alpha memory of the alpha network cause activations in, and are visible to, nodes of an associated beta network.

In one embodiment, alpha memory gates control admission to beta network nodes, so joins between the alpha network of nodes and beta network of nodes may be enabled only during a relevant period (e.g., a join of data in an alpha memory with data in a beta memory). In some embodiments, a circular schedule queue may be implemented to activate and deactivate the alpha memory gates. For example, for a rule that matches an event with positional constraint of (1:100), the rule schedules an alpha memory gate to callback on its parent alpha memory to activate the alpha memory gate at one event in the future, or at event 1 after event 0. The rule also schedules the alpha memory gate to callback on its parent alpha memory to deactivate the alpha memory gate after 100 events in the future or after event 100 and before event 101. Thus, the circular activation schedule may be configured to be as long as the longest positional constraint in a given production rules network. For production rules network 400, the circular activation schedule may be configured to have 101 positions from position 0 to position 100, since the longest positional constraint is (1:100) in production rules network 400. In some cases, events are analyzed relative to when the events arrive. Each time an event is received a "now" pointer may be incremented along the circular activation schedule. If the now pointer is at position 37, as one example, and event 0 occurs at position 37 for a new set of events, then an activation event may be scheduled at position 38 for event 1 in positional constraint (1:100) and a deactivation event may be scheduled at position 36 for event 100 in positional constraint (1:100), and so forth.

In one embodiment, the first rule may be updated to include a positional constraint. As one example, a rule may include a test for events occurring in a particular order. For example, a rule may stipulate that the various events it matches occur at specific relative positions to one another. So a rule: IF x@(11) AND y@(5) AND z@(3) AND x.action=create AND y.action=open AND z.action=write THEN Alert 1 indicates that the various events matching the given alpha conditions are only passed downstream to the beta network when their individual positional constraints are met as well. So, if a "create" event is seen, the "create" event is stored in its associated alpha memory, but is not passed to the beta network until exactly 11 events have passed, and is discarded before the twelfth event has passed. Similarly, if an "open" event is seen, the "open" event is propagated only when exactly 5 events have passed, and a "write" event is propagated only when exactly 3 events have passed. The rule will only fire when the events occur at the specified relative positions, since only then will all three required events be actively being propagated to the beta network at the same time.

As another example, a positional constraint of "(1:100)" may indicate that an event that matches a set of alpha conditions will be stored in an alpha memory and will be propagated to the beta network starting after the next event arrives and ending after the $100^{th}$ event has arrived. If no other positional constraint with a larger value exists for the event, then the event may be removed from memory after the $100^{th}$ event has arrived.

As another example, a positional constraint of "(11:20)" may indicate that an event must be stored in its alpha memory until 20 more events have been processed, but the event is not allowed to pass downstream to the beta network during the processing of the next ten events. Then upon the network processing the $11^{th}$ event, the original event stored in the alpha memory is allowed to pass downstream to the beta network and continues to be active in the beta network until the $20^{th}$ event arrives.

As one example, a first rule may include; IF x@(0) AND y@(11:20) an (x.action=connect) AND (y.action=accept) AND (x.IP=y.IP) THEN Alert 1. Thus, the first rule may include determining whether an event x includes the action "connect" on the $0^{th}$ event, whether some event, y, occurring between 11 and 20 events before event x, includes the condition "accept", determining whether the internet protocol (IP) address of event x equals the IP address of event y, and when each condition is true triggering the action "Alert 1." A second rule may include: IF y@(1:100) AND (y.action=accept) AND (y.geoIP=RU) THEN Alert 2. Thus, the second rule may be configured to test whether events 1 through 100 include the action "accept," whether a geolocation IP (geoIP) of events 1 through 100 indicates the action originates in Russia, and when each condition is true triggering the action "Alert 2." A third rule associated with fourth beta join node 425 (hardcoded to "true"), beta memory 350-4, and third beta action node 430 may include: IF y@(5) AND (y.action=accept) THEN Alert 3. Thus, the third rule may include determining whether an event y includes the action "accept" with the alpha memories accumulating the events, but only allowing the $5^{th}$ event to pass downstream to the beta network, which results in triggering the action "Alert 3" (performed by third beta action node 430) when event y includes the action "accept" on the $5^{th}$ event. In this example, an "accept" event with a Russian IP will need to be maintained in memory until at least 100 events have passed, while an "accept" event from a non-Russian IP will need to be stored until at least 20 events have passed.

In the illustrated example, first alpha memory gate 405 may be configured with the positional constraint of "(0)" according to the "x@(0) AND (x.action=connect;)" portion of the first rule. Similarly, second alpha memory gate 410 may be configured with the positional constraint of "(1:100)" according to the "y@(1:100) AND (y.action=accept) AND (y.geoIP=RU" portion of the second rule. Similarly, third alpha memory gate 415 may be configured with the positional constraint of "(11:20)" according to the "y@(11:20) AND (y.action=accept)" portion of the first rule. And fourth alpha memory gate 420 may be configured with the positional constraint of "(5)" according to the "y@(5) AND (y.action=accept)" portion of the third rule. As shown, alpha memory 325-3 may be associated with two children alpha memory gates, third alpha memory gate 415 and fourth alpha memory gate 420. In one embodiment, following the arrival of a matching event at alpha memory 325-3, once the network has processed the largest number of events specified in any of these children alpha memory gates 415 and 420, in this case twenty, the alpha memory 325-3 may clear out or erase the matching event from its memory. In some cases, an alpha memory gate of the production rules network 400 associated with a positional constraint may be simultaneously constraining multiple events that arrived at an alpha memory at different times. In these cases, the positional constraint enforced by the alpha memory gate is applied separately for each event relative to the time the event arrived. For example, if one matching event arrives at alpha memory 325-3 at time t, and another matching event arrives four events later at time t+4, then the first event can be removed from memory at time t+20 while the second can be removed at time t+24. Similarly, alpha memory gate 415 may propagate the first event to its downstream beta nodes during times t+10 to t+20, while it propagates the second matching event during times t+14 to t+24, while alpha memory gate 420 propagates the first event at time t+5 and the second event at time t+9. In some embodiments, performing the appropriate action at the proper relative time is efficiently handled by callbacks from a circular activation schedule.

Accordingly, an alpha memory gate may act as a gatekeeper or gateway between nodes of an alpha network and nodes of a beta network. As indicated above, an alpha memory gate configured with a positional constraint of (11:20) does not allow the beta network to see a matched event during the processing of the next 10 events, and only propagates the matched event to the downstream beta network during the processing of the 11th through $20^{th}$ events after the matching event arrived at the corresponding alpha memory node. Accordingly, a positional constraint may configure an alpha memory gate to filter the period during which facts are propagated to an associated beta network. Accordingly, the alpha memory gate enables a production rule system to avoid storing events that are no longer relevant according to the constraints of a particular rule. Additionally or alternatively, the alpha memory gate enables a production rule system to avoid performing unnecessary join tests between events that are not relevant to each other according to the constraints of a particular rule, for instance, events that occur too far apart in time and/or too far apart in sequence to be relevant according to the associated rule events, or events that are not yet activated or are no longer activated and have been deactivated according to the positional constraints of a particular rule, or any combination thereof.

Accordingly, events may be safely discarded when deactivations for all relevant rules have been processed. When all of the deactivations for an alpha memory match have been processed, it can be safely discarded from memory. In this way, the activation schedule makes efficient use of associated memories while still allowing some rules to look over very large windows of events. Also, analysis of which fields are used in downstream beta nodes may further reduce a memory footprint by discarding irrelevant portions of events. In some cases, the event stream adaptation module 145 may perform an analysis that runs on the compiled Rete graph of a production rules network such as production rules network 300 and/or 400 and determine, based at least in part on the analysis, the minimal set of fields and/or nodes for each fact that may be called for during each activation period. The event stream adaptation module 145 may then discard portions of certain facts and the associated fields/nodes when the facts are determined to no longer be needed for determining matches or execute actions.

A real-world test of the present systems and methods may was performed using a JavaScript Object Notation (JSON) file. A production rules network of the present systems and methods was tested relative to a 7.6 gigabyte (GB) JSON file that included 4.2 million events. At least 1,800 source rules were generated to match against the 4.2 million events. The 4.2 million events were passed through the production rules network. 1.3 million rule match instances were detected at 14,000 events per second on a single laptop core with a total memory footprint of 60 to 80 megabytes (MB).

The present systems and methods include several benefits, including an improvement in memory efficiency of a production rule network implementing the present systems and methods. For example, scheduling callbacks avoids traversing all alpha memories to look for activations/deactivations. When events arrive at alpha memories, activations and deactivations are scheduled for the alpha memory gate children. Beta join node are not activated until an associated alpha memory gate is activated, improving memory efficiency. Events are only tested for join condition while the events are active, again improving memory efficiency. An event may be safely discarded after a last associated alpha memory gate is deactivated, improving memory efficiency. In some cases, alpha memories may choose to store only relevant portions of events based on field use on all downstream paths, again improving memory efficiency.

Figure 5:
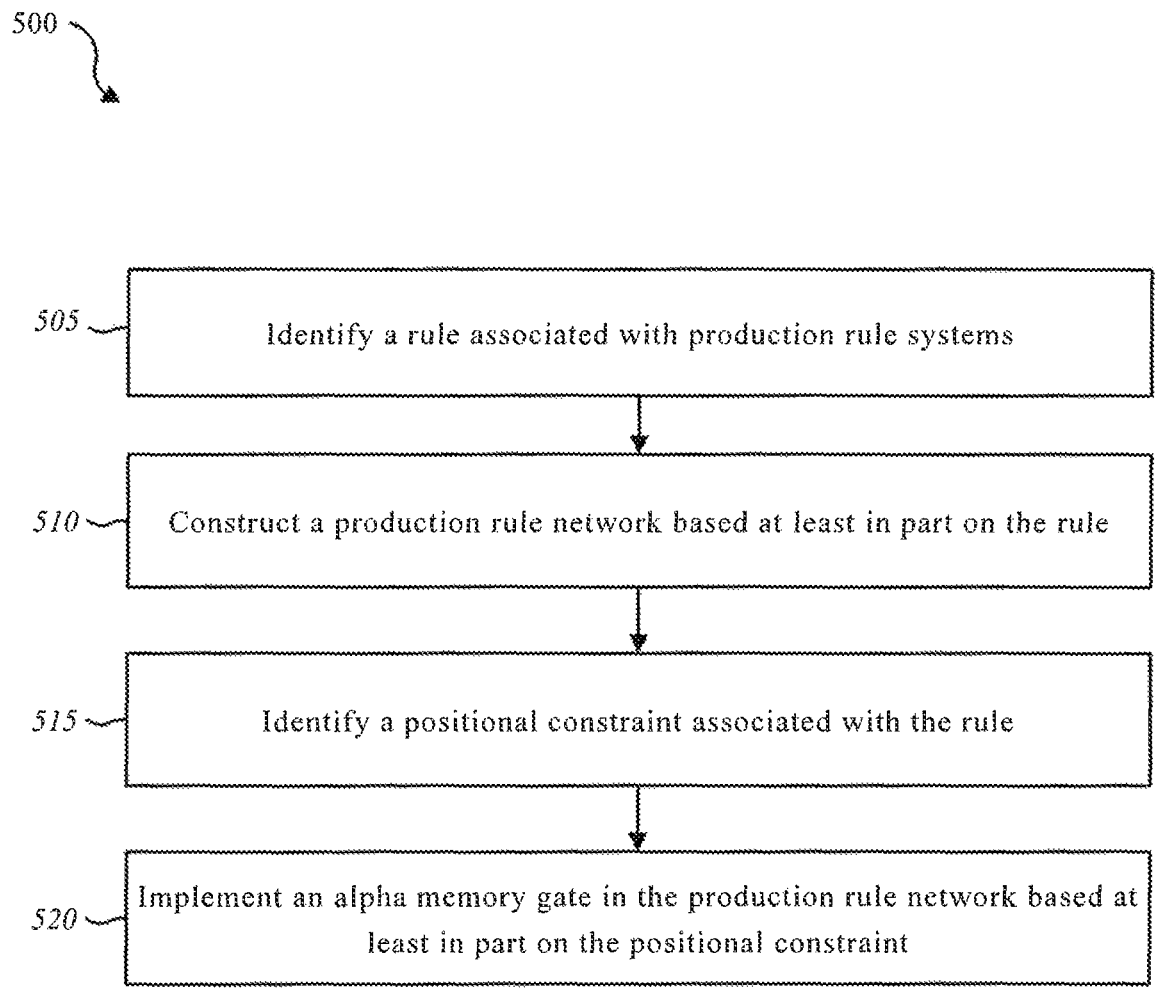
FIG. 5 is a flow diagram illustrating one embodiment of a method in accordance with various aspects of this disclosure.

FIG. 5 is a flow diagram illustrating one embodiment of a method 500 for improving memory efficiency of production rule systems. In some configurations, the method 500 may be implemented by the event stream adaptation module 145 illustrated in FIG. 1 or 2. In some configurations, the method 500 may be implemented in conjunction with device 105, server 110, network 115, database 120, components thereof, or any combination thereof.

In block 505, method 500 may include identifying a rule associated with production rule systems. In block 510, method 500 may include constructing a production rule network based at least in part on the rule. In block 515, method 500 may include identifying a positional constraint associated with the rule. In block 520, method 500 may include implementing an alpha memory gate in the production rule network based at least in part on the positional constraint. In some cases, the alpha memory gate may be one of multiple nodes of the production rule network.

Figure 6:
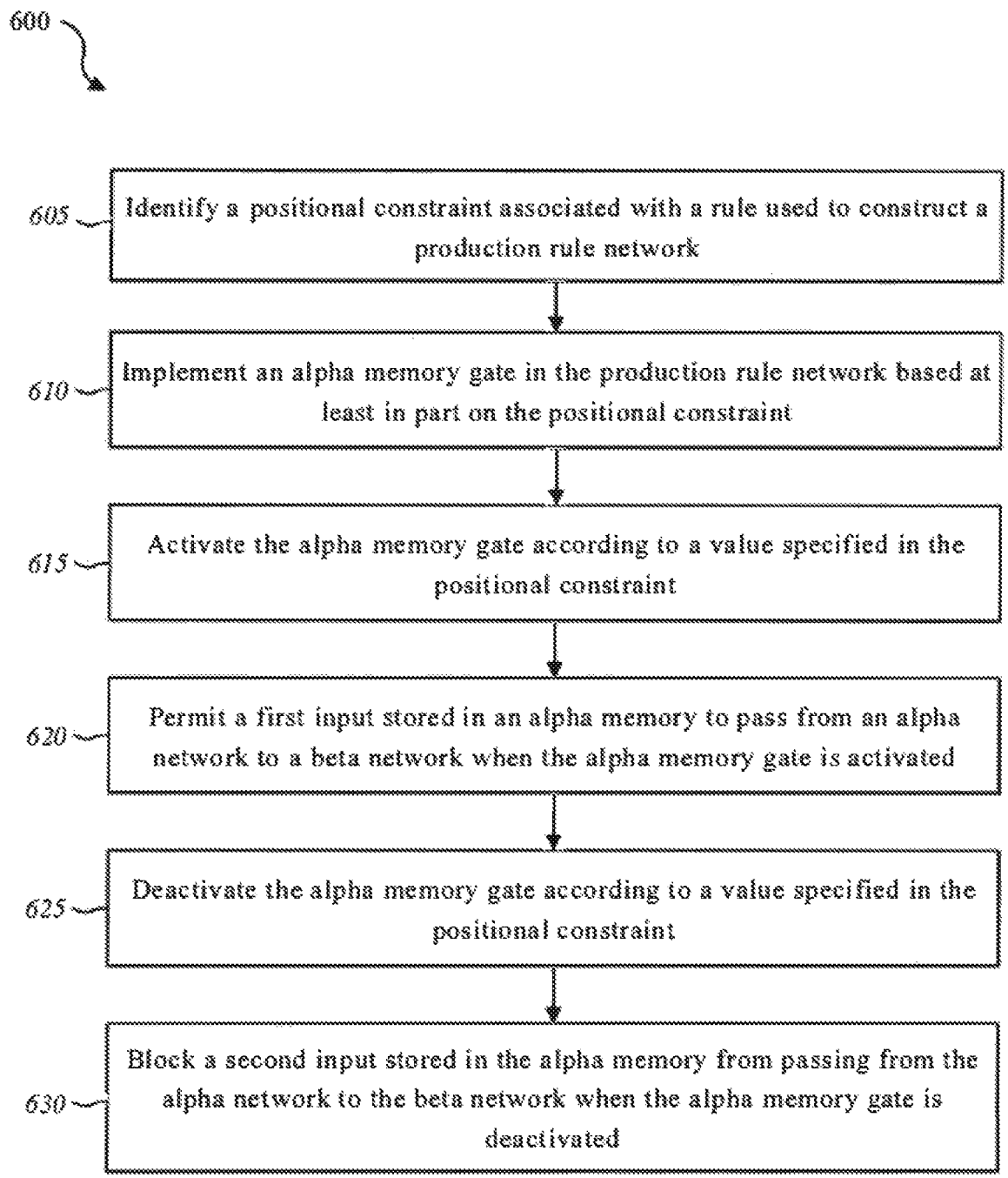
FIG. 6 is a flow diagram illustrating one embodiment of a method in accordance with various aspects of this disclosure.

FIG. 6 is a flow diagram illustrating one embodiment of a method 600 for improving memory efficiency of production rule systems. In some configurations, the method 600 may be implemented by the event stream adaptation module 145 illustrated in FIGS. 1 and/or 2. In some configurations, the method 600 may be implemented in conjunction with device 105, server 110, network 115, database 120, components thereof, or any combination thereof.

In block 605, method 600 may include identifying a positional constraint associated with a rule used to construct a production rule network. In block 610, method 600 may include implementing an alpha memory gate in the production rule network based at least in part on the positional constraint. In block 615, method 600 may include activating the alpha memory gate according to a value specified in the positional constraint. In block 620, method 600 may include permitting a first input stored in an alpha memory to pass from an alpha network to a beta network when the alpha memory gate is activated. In block 625, method 600 may include deactivating the alpha memory gate according to a value specified in the positional constraint. In block 630, method 600 may include blocking a second input stored in the alpha memory from passing from the alpha network to the beta network when the alpha memory gate is deactivated.

Figure 7:
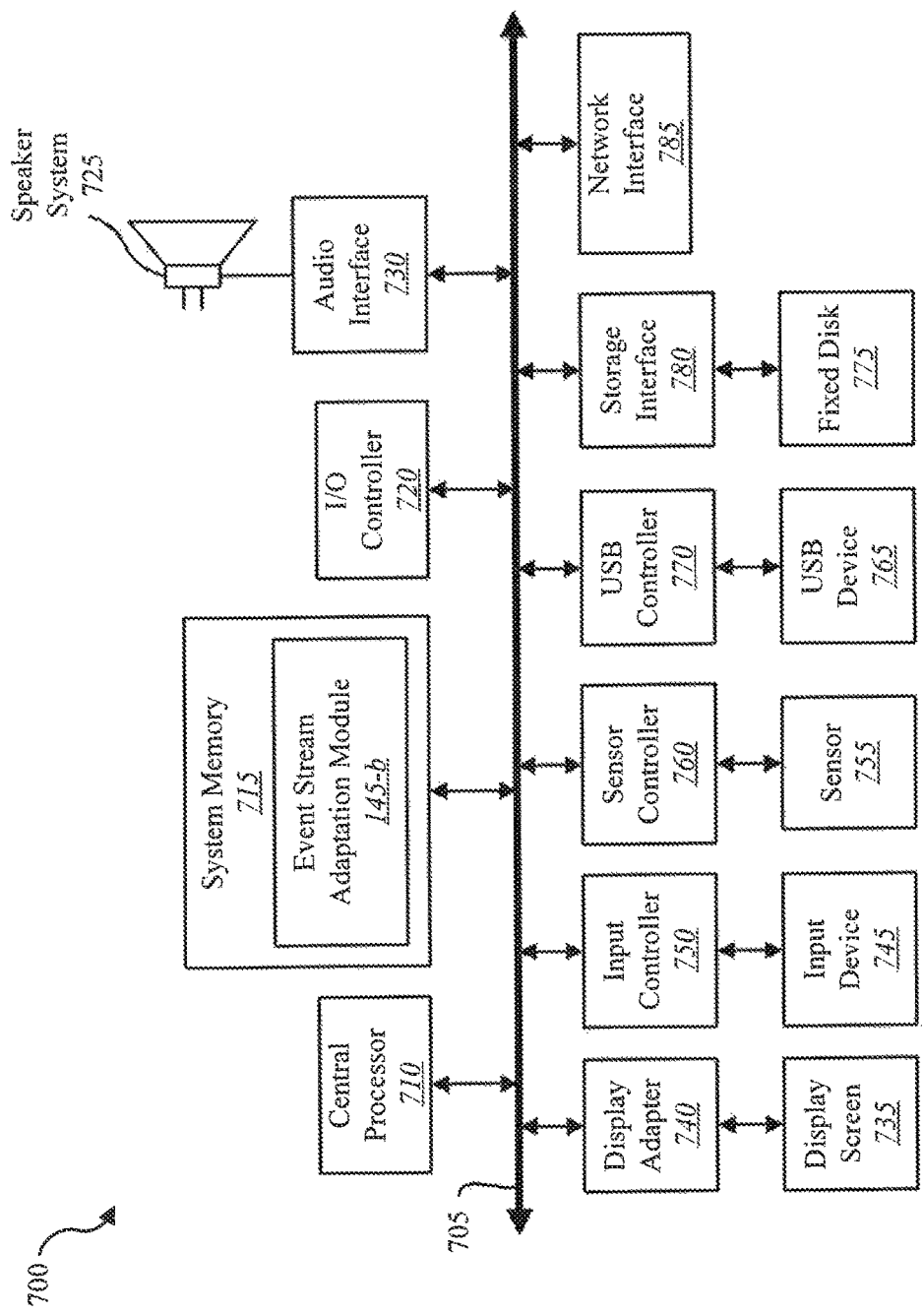
FIG. 7 depicts a block diagram of a computer system suitable for implementing the present systems and methods.

FIG. 7 depicts a block diagram of a computing device 700 suitable for implementing the present systems and methods. The device 700 may be an example of device 105, computing device 150, and/or server 110 illustrated in FIG. 1. In one configuration, device 700 includes a bus 705 which interconnects major subsystems of device 700, such as a central processor 710, a system memory 715 (typically RAM, but which may also include ROM, flash RAM, or the like), an input/output controller 720, an external audio device, such as a speaker system 725 via an audio output interface 730, an external device, such as a display screen 735 via display adapter 740, an input device 745 (e.g., remote control device interfaced with an input controller 750), multiple USB devices 765 (interfaced with a USB controller 770), and a storage interface 780. Also included are at least one sensor 755 connected to bus 705 through a sensor controller 760 and a network interface 785 (coupled directly to bus 705).

Bus 705 allows data communication between central processor 710 and system memory 715, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the event stream adaptation module 145-b to implement the present systems and methods may be stored within the system memory 715. Applications (e.g., application 140) resident with device 700 are generally stored on and accessed via a non-transitory computer readable medium, such as a hard disk drive (e.g., fixed disk 775) or other storage medium. Additionally, applications can be in the form of electronic signals modulated in accordance with the application and data communication technology when accessed via interface 785.

Storage interface 780, as with the other storage interfaces of device 700, can connect to a standard computer readable medium for storage and/or retrieval of information, such as a fixed disk drive 775. Fixed disk drive 775 may be a part of device 700 or may be separate and accessed through other interface systems. Network interface 785 may provide a direct connection to a remote server via a direct network link to the Internet via a POP (point of presence). Network interface 785 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to device 700 wirelessly via network interface 785.

Many other devices and/or subsystems may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 7 need not be present to practice the present systems and methods. The devices and subsystems can be interconnected in different ways from that shown in FIG. 7. The aspect of some operations of a system such as that shown in FIG. 7 are readily known in the art and are not discussed in detail in this application. Code to implement the present disclosure can be stored in a non-transitory computer-readable medium such as one or more of system memory 715 or fixed disk 775. The operating system provided on device 700 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with system 700 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network interface 785 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc The I/O controller 720 may operate in conjunction with network interface 785 and/or storage interface 780. The network interface 785 may enable system 700 with the ability to communicate with client devices (e.g., device 105 of FIG. 1), and/or other devices over the network 115 of FIG. 1. Network interface 785 may provide wired and/or wireless network connections. In some cases, network interface 785 may include an Ethernet adapter or Fibre Channel adapter. Storage interface 780 may enable system 700 to access one or more data storage devices. The one or more data storage devices may include two or more data tiers each. The storage interface 780 may include one or more of an Ethernet adapter, a Fibre Channel adapter, Fibre Channel Protocol (FCP) adapter, a SCSI adapter, and iSCSI protocol adapter.

Figure 8:
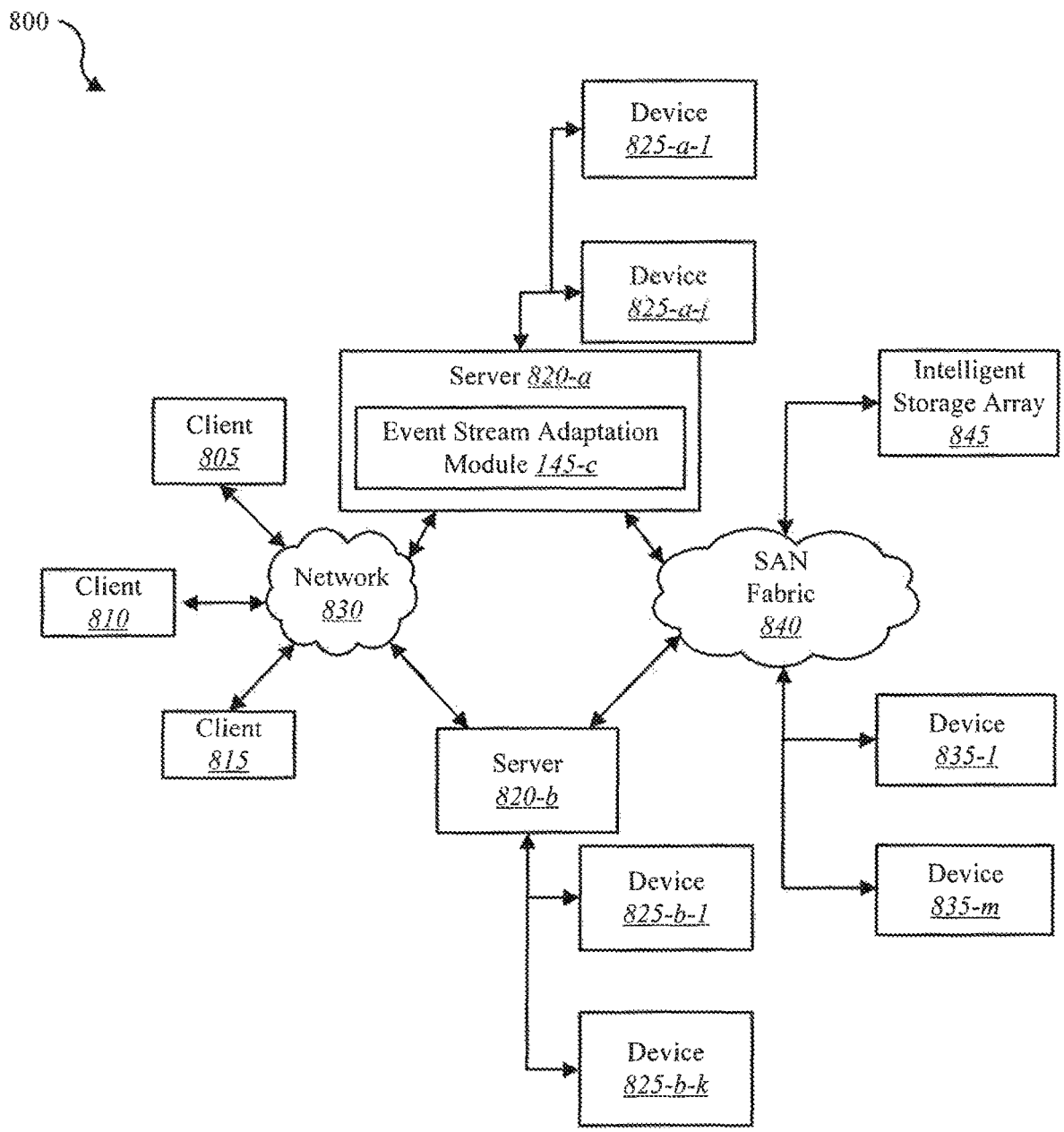
FIG. 8 depicts a block diagram of a computer system suitable for implementing the present systems and methods.

FIG. 8 is a block diagram depicting a network architecture 800 in which client systems 805, 810 and 815, as well as storage servers 820-*a* and 820-*b* (any of which can be implemented using computer system 700), are coupled to a network 830. In one embodiment, event stream adaptation module 145-*c* may be located within one of the storage servers 820-*a*, 820-*b* to implement the present systems and methods. Event stream adaptation module 145-*c* may be one example of event stream adaptation module 145 depicted in FIGS. 1, 2, and/or 7. The storage server 820-*a* is further depicted as having storage devices 825-*a*-1 through 825-*a*-*j* directly attached, and storage server 820-*b* is depicted with storage devices 825-*b*-1 through 825-*b*-*k* directly attached. SAN fabric 840 supports access to storage devices 835-1 through 835-*m* by storage servers 820-*a* and 820-*b*, and so by client systems 805, 810 and 815 via network 830. Intelligent storage array 845 is also shown as an example of a specific storage device accessible via SAN fabric 840.

With reference to computer system 700, network interface 785 or some other method can be used to provide connectivity from each of client computer systems 805, 810 and 815 to network 830. Client systems 805, 810 and 815 are able to access information on storage server 820-*a* or 820-*b* using, for example, a web browser or other client software (not shown). Such a client allows client systems 805, 810 and 815 to access data hosted by storage server 820-*a* or 820-*b* or one of storage devices 825-*a*-1 to 825-*a*-*j*, 825-*b*-1 to 825-*b*-*k*, 835-1 to 835-*m* or intelligent storage array 845. FIG. 8 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

As used herein, the term "security action" may refer to any number of actions the systems described herein may take after determining that a file likely includes some type of malware. For example, types of security actions may include preventing the file from performing any actions on the computing device, alerting an administrator to the potential maliciousness of the file, quarantine the file, delete the file, block a download of the file, and/or warn a user about the file. In addition, the systems described herein may perform a security action on objects other than a file. For example, the systems described herein may blacklist malicious URLs and/or IP addresses. Thus, the security actions in conjunction with the methods and systems described herein may improve the security and operating integrity of one or more computing devices by protecting the hardware, firmware, software, or any combination thereof of the one or more computing devices from malicious attack. It should be appreciated that these are not exhaustive lists of the types of security actions which may be performed by the systems described herein. Other security actions are also included in this disclosure.

What is claimed is:

1. A method for improving efficiency of a pattern matching system, comprising:
   identifying a rule associated with production rule systems;
   constructing a production rule network based at least in part on the rule;
   identifying a positional constraint associated with the rule, wherein the positional constraint controls which inputs are allowed to pass downstream based at least in part on a position of a given input relative to positions of a circular schedule queue;
   implementing an alpha memory gate at an interface between an alpha memory and a beta join node in the production rule network based at least in part on the positional constraint, the alpha memory gate being one of a plurality of nodes of the production rule network;
   implementing the production rule network to monitor a computing device; and
   performing a security action based at least in part on the monitoring.

2. The method of claim 1, wherein the plurality of nodes of the production rule network include one or more nodes in an alpha network and one or more nodes in a beta network, and wherein the alpha memory gate is positioned in between the alpha network and the beta network.

3. The method of claim 2, wherein the alpha memory of the alpha network receives an input and the alpha memory gate controls whether the input is allowed to pass downstream to the beta join node of the beta network.

4. The method of claim 3, further comprising:
   activating the alpha memory gate when the positional constraint is satisfied.

5. The method of claim 4, wherein the alpha memory gate when activated permits the input stored by the alpha memory to pass from the alpha network to the beta network.

6. The method of claim 3, further comprising:
   deactivating the alpha memory gate when the positional constraint is not satisfied; and
   removing the input from the alpha memory based at least in part on the deactivation of the alpha memory gate.

7. The method of claim 6, wherein the alpha memory gate when deactivated does not permit the input stored by the alpha memory to pass from the alpha network to the beta network.

8. The method of claim 1, wherein the alpha memory gate is positioned between the gate connected to the alpha memory and the gate connected to the beta join node within the production rule network.

9. The method of claim 1, wherein the alpha memory gate is configured with the positional constraint.

10. The method of claim 1, wherein nodes of the production rule network are constructed and positioned in the production rule network according to a Rete algorithm.

11. A computing device configured for improving efficiency of a pattern matching system, comprising:
    one or more processors;
    memory in electronic communication with the one or more processors, wherein the memory stores computer executable instructions that when executed by the one or more processors cause the one or more processors to perform the steps of:
    identifying a rule associated with production rule systems;
    constructing a production rule network based at least in part on the rule;
    identifying a positional constraint associated with the rule, wherein the positional constraint controls which inputs are allowed to pass downstream based at least in part on a position of a given input relative to positions of a circular schedule queue;
    implementing an alpha memory gate at an interface between an alpha memory and a beta join node in the production rule network based at least in part on the positional constraint, the alpha memory gate being one of a plurality of nodes of the production rule network;
    implementing the production rule network to monitor the computing device; and
    performing a security action based at least in part on the monitoring.

12. The computing device of claim 11, wherein the plurality of nodes of the production rule network include one or more nodes in an alpha network and one or more nodes in a beta network, and wherein the alpha memory gate is positioned in between the alpha network and the beta network.

13. The computing device of claim 12, wherein the alpha memory of the alpha network receives an input and the alpha memory gate controls whether the input is allowed to pass downstream to the beta join node of the beta network.

14. The computing device of claim 13, wherein the instructions executed by the one or more processors cause the one or more processors to perform the steps of:

activating the alpha memory gate when the positional constraint is satisfied.

15. The computing device of claim 14, wherein the alpha memory gate when activated permits the input stored by the alpha memory to pass from the alpha network to the beta network.

16. The computing device of claim 13, wherein the instructions executed by the one or more processors cause the one or more processors to perform the steps of:

deactivating the alpha memory gate when the positional constraint is not satisfied; and removing the input from the alpha memory based at least in part on the deactivation of the alpha memory gate.

17. The computing device of claim 16, wherein the alpha memory gate when deactivated does not permit the input stored by the alpha memory to pass from the alpha network to the beta network.

18. The computing device of claim 11, wherein the alpha memory gate is positioned between the gate connected to the alpha memory and the gate connected to the beta join node within the production rule network.

19. A non-transitory computer-readable storage medium storing computer executable instructions that when executed by one or more processors cause the one or more processors to perform the steps of:

identifying a rule associated with production rule systems;

constructing a production rule network based at least in part on the rule;

identifying a positional constraint associated with the rule, wherein the positional constraint controls which inputs are allowed to pass downstream based at least in part on a position of a given input relative to positions of a circular schedule queue;

implementing an alpha memory gate at an interface between an alpha memory and a beta join node in the production rule network based at least in part on the positional constraint, the alpha memory gate being one of a plurality of nodes of the production rule network;

implementing the production rule network to monitor a computing device; and performing a security action based at least in part on the monitoring.

20. The non-transitory computer-readable storage medium of claim 19, wherein the plurality of nodes of the production rule network include one or more nodes in an alpha network and one or more nodes in a beta network, and wherein the alpha memory gate is positioned in between the alpha network and the beta network.

* * * * *